United States Patent
Taniguchi et al.

(10) Patent No.: US 11,427,251 B2
(45) Date of Patent: Aug. 30, 2022

(54) LANE SEPARATION LINE DETECTION CORRECTING DEVICE, LANE SEPARATION LINE DETECTION CORRECTING METHOD, AND AUTOMATIC DRIVING SYSTEM

(71) Applicant: Mitsubishi Electric Corporation, Tokyo (JP)

(72) Inventors: Takuya Taniguchi, Tokyo (JP); Noritaka Kokido, Tokyo (JP); Koji Iida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 384 days.

(21) Appl. No.: 16/656,881

(22) Filed: Oct. 18, 2019

(65) Prior Publication Data

US 2020/0047804 A1 Feb. 13, 2020

Related U.S. Application Data

(62) Division of application No. 15/434,157, filed on Feb. 16, 2017, now Pat. No. 10,494,021.

(51) Int. Cl.
*B62D 15/02* (2006.01)
*B60R 16/023* (2006.01)
(Continued)

(52) U.S. Cl.
CPC ........ *B62D 15/025* (2013.01); *B60R 16/0231* (2013.01); *B62D 15/029* (2013.01);
(Continued)

(58) Field of Classification Search
CPC ................ B62D 15/025; B62D 15/029; B60R 16/0231; G06K 9/00798; G08G 1/09623;
(Continued)

(56) References Cited

U.S. PATENT DOCUMENTS

| 8,665,079 B2* | 3/2014 | Pawlicki | B60W 30/12 340/436 |
| 2002/0016663 A1* | 2/2002 | Nakamura | G01S 13/931 180/170 |

(Continued)

FOREIGN PATENT DOCUMENTS

| JP | 2707199 B2 * | 1/1998 |
| JP | 2007516906 A | 6/2007 |

(Continued)

OTHER PUBLICATIONS

Preliminary Notice of Reasons for Rejection in Japanese Patent Application No. 2016-151030, dated Jun. 27, 2017.

*Primary Examiner* — Nga X Nguyen
(74) *Attorney, Agent, or Firm* — Sughrue Mion, PLLC; Richard C. Turner

(57) ABSTRACT

Provided are a lane separation line detection correcting device/method and an automatic driving system for stabilizing the behavior of a vehicle by correcting overestimated curvature information resulting from an erroneous detection of a curvature of a lane separation line. A travel speed detecting circuit detects, for example, a target travel speed as vehicle sensor information. A maximum curvature estimating circuit estimates, based on the target travel speed, a maximum curvature of a road along which an own vehicle is traveling. A curvature correcting circuit corrects a curvature of a lane separation line input thereto based on the maximum curvature. A control unit controls steering of the own vehicle based on the lane separation line having a corrected curvature. As a result, vehicle steering can be automatically controlled so as to prevent the own vehicle while traveling from departing from a driving lane.

1 Claim, 16 Drawing Sheets

(51) Int. Cl.
*G06K 9/00* (2022.01)
*G08G 1/0962* (2006.01)
*G08G 1/0967* (2006.01)
*G08G 1/16* (2006.01)
*G06V 20/56* (2022.01)

(52) U.S. Cl.
CPC ....... *G06V 20/588* (2022.01); *G08G 1/09623* (2013.01); *G08G 1/096716* (2013.01); *G08G 1/096725* (2013.01); *G08G 1/096758* (2013.01); *G08G 1/096783* (2013.01); *G08G 1/167* (2013.01)

(58) Field of Classification Search
CPC ....... G08G 1/096716; G08G 1/096725; G08G 1/096758; G08G 1/096783; G08G 1/167; G06V 20/588
See application file for complete search history.

(56) References Cited

U.S. PATENT DOCUMENTS

| | | | |
|---|---|---|---|
| 2012/0215377 | A1 | 8/2012 | Takemura et al. |
| 2012/0277965 | A1* | 11/2012 | Takahashi ........... B60W 30/143 701/70 |
| 2013/0063600 | A1* | 3/2013 | Pawlicki ................ B60R 11/04 348/148 |
| 2018/0265084 | A1* | 9/2018 | Inou ........................ G08G 1/16 |

FOREIGN PATENT DOCUMENTS

| | | |
|---|---|---|
| JP | 2009230455 A | 10/2009 |
| JP | 2010151692 A | 7/2010 |
| JP | 2014044493 A | 3/2014 |
| JP | 2015-197794 A | 11/2015 |
| WO | 2012137354 A1 | 10/2012 |
| WO | 2014115531 A1 | 7/2014 |

* cited by examiner

LANE SEPARATION LINE DETECTION CORRECTING DEVICE, LANE SEPARATION LINE DETECTION CORRECTING METHOD, AND AUTOMATIC DRIVING SYSTEM

CROSS-REFERENCE TO RELATED APPLICATIONS

This application is a divisional of U.S. patent application Ser. No. 15/434,157, filed on Feb. 16, 2017, in the U.S. Patent and Trademark Office, and claims priority from Japanese Patent Application No. 2016-151030, filed on Aug. 1, 2016, the disclosures of which are incorporated herein in their entireties by reference.

BACKGROUND OF THE INVENTION

1. Field of the Invention

The present invention relates to a lane separation line detection correcting device and a lane separation line detection correcting method, which are used upon automatic control of a steering angle of a vehicle so that the vehicle is may be prevented from departing from a driving lane when the vehicle has almost departed from the driving lane during traveling, and to an automatic driving system including the lane separation line detection correcting device.

2. Description of the Related Art

Hitherto, there has been a technology for detecting a position, an inclination, and a curvature of a lane separation line, which is represented by a white line, based on image information taken by a camera, and for automatically controlling the steering angle of a vehicle by using the detected position, inclination, and curvature so that the vehicle may not depart from a driving lane, as seen from e.g. Japanese Patent Application Laid-open No. 2015-197794.

However, the image information taken by the camera is greatly influenced by the surrounding environment, such as road surface glare from the sun, the lights of an oncoming vehicle, shadows on the road surface, paint, etc. As a result, when the position, inclination, and curvature of the lane separation line are detected in the environment that is constantly changing during traveling, accuracy of the detection often deteriorates.

In particular respect of the lane separation line, there is a need to detect the curvature far away. In such a case, a phenomenon may occur in which the curvature is detected as being several times larger than that of the actual road shape due to an erroneous detection caused by obstruction to the curvature detection by a preceding vehicle, an oncoming vehicle, etc. At the time when the steering angle of the vehicle is automatically controlled by using overestimated curvature information resulting from that erroneous detection, there is a problem in that the behavior of the vehicle becomes unstable.

SUMMARY OF THE INVENTION

Having been made in order to solve the above-mentioned problem, the present invention has an object to provide a lane separation line detection correcting device, a lane separation line detection correcting method, and an automatic driving system for stabilizing the behavior of a vehicle by correcting overestimated curvature information resulting from an erroneous detection of a curvature of a lane separation line.

For achieving the above object, the present invention provides a lane separation line detection correcting device, comprising: a maximum curvature estimating circuit to estimate a maximum curvature of a road along which an own vehicle is traveling based on vehicle sensor information; and a curvature correcting circuit to correct a curvature of a lane separation line input to the curvature correcting circuit, based on the maximum curvature.

Also, for achieving the above object, the present invention provides a lane separation line detection correcting method, comprising: estimating, by a maximum curvature estimating circuit, a maximum curvature of a road along which an own vehicle is traveling, based on vehicle sensor information; and correcting, by a curvature correcting circuit, a curvature of a lane separation line input to the curvature correcting circuit, based on the maximum curvature.

Further, for achieving the above object, the present invention provides an automatic driving system, comprising: the lane separation line detection correcting device of claim 1; and a control circuit to control steering of the own vehicle based on a lane separation line having a curvature corrected by the curvature correcting circuit.

According to the present invention, the maximum curvature of the road along which the vehicle is traveling is estimated based on vehicle sensor information, and based on that maximum curvature estimated, the curvature of the lane separation line input is corrected. As a result, an overestimated curvature caused by an erroneous detection can be suppressed, and vehicle steering control that utilizes the information on the lane separation line can be stabilized.

DETAILED DESCRIPTION OF THE EMBODIMENTS

A lane separation line detection correcting device, a lane separation line detection correcting method, and an automatic driving system according to a first embodiment to a ninth embodiment of the present invention will now be described in detail with reference to the above drawings attached. In each of the first to ninth embodiments, because the lane separation line detection correcting device and the lane separation line detection correcting method correspond to each other, the following descriptions will be made based on the lane separation line detection correcting device.

First Embodiment

<Configuration of Lane Separation Line Detection Correcting Device 1>

Figure 1:
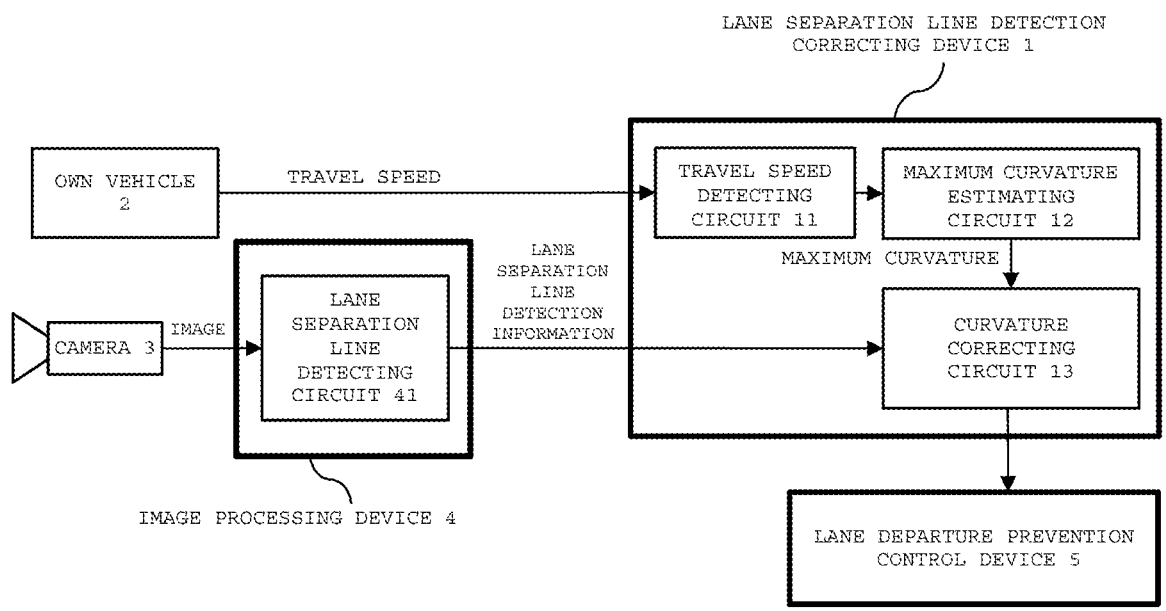
FIG. 1 is a block diagram for illustrating a configuration of a lane separation line detection correcting device and a lane separation line detection correcting method according to a first embodiment of the present invention.

A lane separation line detection correcting device 1 illustrated in FIG. 1 according to a first embodiment of the present invention includes a travel speed detecting circuit 11, a maximum curvature estimating circuit 12, and a curvature correcting circuit 13. The travel speed detecting circuit 11 is configured to acquire a current travel speed from an own vehicle 2. The maximum curvature estimating circuit 12 is configured to estimate a maximum curvature of a road based on the current travel speed acquired by the travel speed detecting circuit 11. The curvature correcting circuit 13 is configured to correct, based on the maximum curvature obtained from the maximum curvature estimating circuit 12, a curvature of a lane separation line input from a lane separation line detecting circuit 41 of an image processing device 4, and to output detection information on the lane separation line to an external lane departure prevention control device 5. The lane separation line detecting circuit 41 is configured to detect the lane separation line by image processing with an image taken by an external camera 3. The lane departure prevention control device 5 may also be a lane departure prevention warning device.

<Operation of Lane Separation Line Detection Correcting Device 1>

Figure 2:
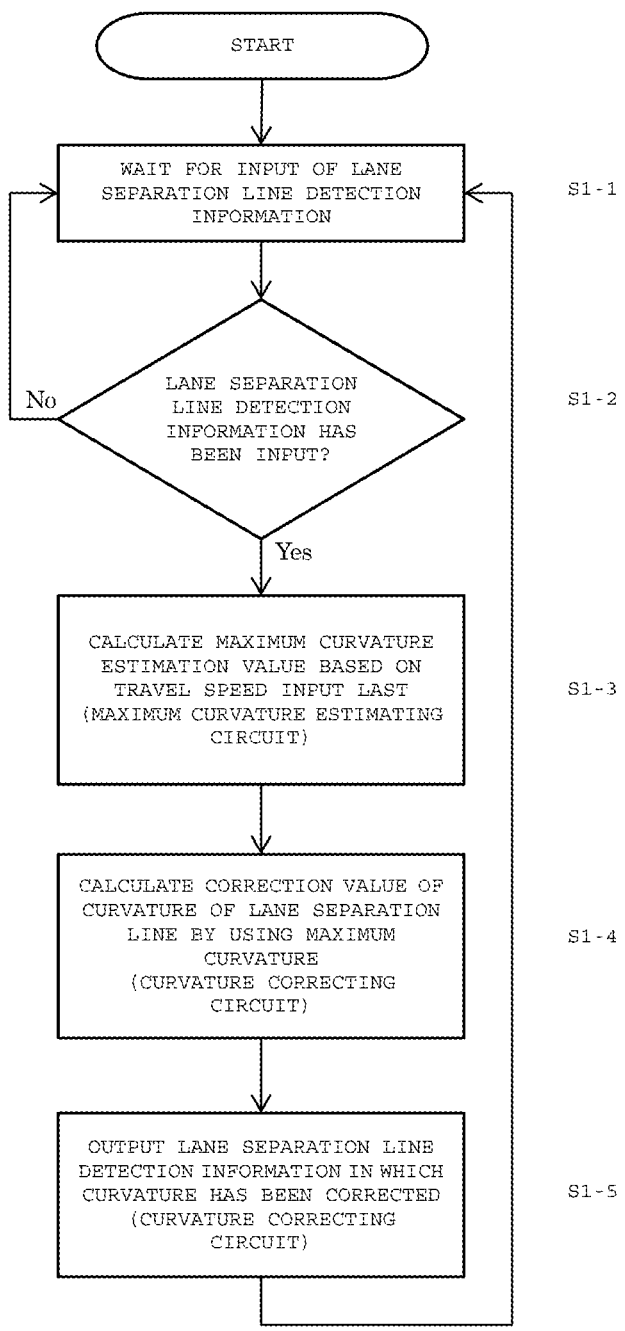
FIG. 2 is a flowchart for illustrating an algorithm according to the first embodiment illustrated in FIG. 1.

An operation flowchart of the lane separation line detection correcting device 1 is illustrated in FIG. 2. First, the lane separation line detection correcting device 1 waits for input of lane separation line detection information from the image processing device 4 (Steps S1-1 and S1-2). At the time when the lane separation line detection information is input, the maximum curvature estimating circuit 12 calculates an estimation value of the maximum curvature based on, for example, the newest or latest travel speed input last via the travel speed detecting circuit 11, and transmits to the curvature correcting circuit 13 the calculated estimation value as the maximum curvature (Step S1-3). The curvature correcting circuit 13 uses the maximum curvature to correct the curvature in the lane separation line detection information input from the lane separation line detecting circuit 41 (Step S1-4). The lane separation line detection information containing the corrected curvature is then output from the curvature correcting circuit 13 to the external lane departure prevention control device 5 (Step S1-5).

<Operation of Maximum Curvature Estimating Circuit 12>

The maximum curvature estimating circuit 12 is configured to calculate an estimation value of the maximum curvature of the lane separation line based on the input travel speed. The maximum curvature estimating circuit 12 is configured to calculate an estimation value κ of the maximum curvature based on Expression (1), and to transmit the calculated estimation value κ to the curvature correcting circuit 13:

$$\kappa = \frac{1}{R} = \alpha \frac{gf}{v^2} [\text{m}^{-1}] \qquad \text{Expression (1)}$$

where v represents a speed (m/s), R represents a minimum flat curve radius (m), g represents a gravitational acceleration (m/s$^2$), and f represents a side slip friction coefficient between a road surface and tires.

A coefficient α is an experimentally-determined value. Because a road curvature at a design speed of a road varies depending on the country or region in which the lane separation line detection correcting device of the present invention is assumed to be used, a value of "1" or less is specified in accordance with that road curvature. A specified value of "1" represents the curvature at which the vehicle can travel at its actual speed without side-slip.

<Operation of Curvature Correcting Circuit 13>

The curvature correcting circuit 13 is configured to calculate a corrected curvature $L_i$ by correcting a curvature $K_i$ in the lane separation line detection information in accordance with Expression (2) based on the estimated value κ of the maximum curvature calculated by the maximum curvature estimating circuit 12, and to output lane separation line detection information containing the calculated curvature $L_i$ to the external lane departure prevention control device 5:

$$\begin{cases} L_i = K_i & (\kappa \geq K_i) \\ L_i = L_{i-1} & (\kappa < K_i) \end{cases} \qquad \text{Expression (2)}$$

where $L_{i-1}$ represents the curvature of the lane separation line detection information corrected last time.

Second Embodiment

<Configuration of Lane Separation Line Detection Correcting Device 1>

Figure 3:
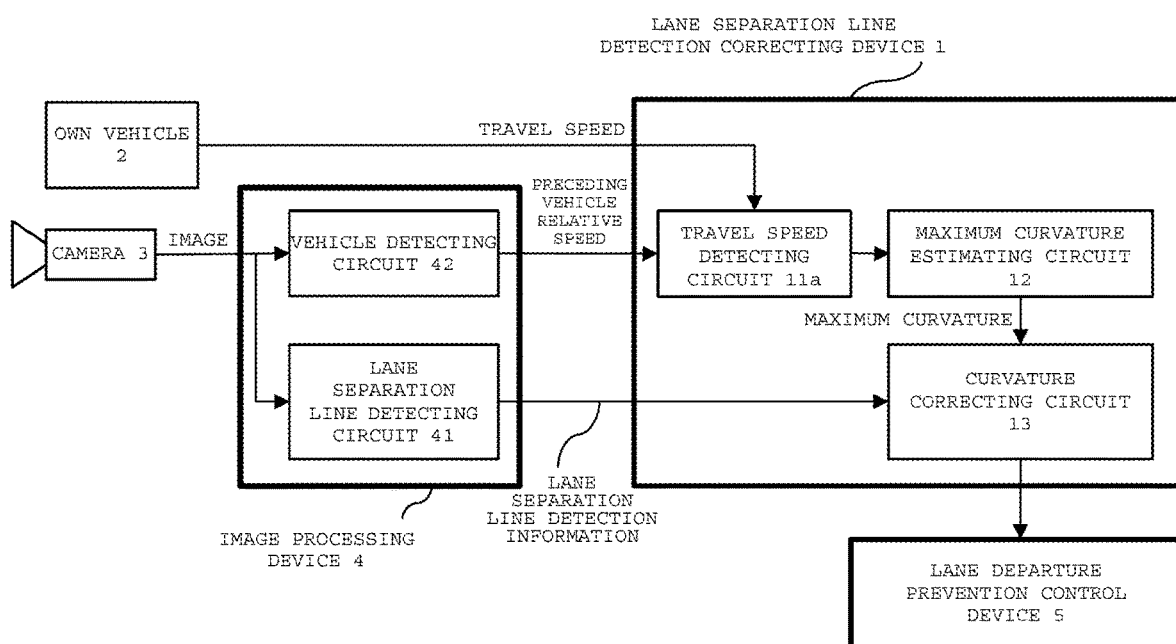
FIG. 3 is a block diagram for illustrating a configuration of a lane separation line detection correcting device and a lane separation line detection correcting method according to a second embodiment of the present invention.

The lane separation line detection correcting device 1 illustrated in FIG. 3 according to a second embodiment of the present invention includes a travel speed detecting circuit 11a, the maximum curvature estimating circuit 12, and the curvature correcting circuit 13. The travel speed detecting circuit 11a is configured to acquire relative speeds of preceding vehicles with respect to the own vehicle output from a vehicle detecting circuit 42 of the image processing device 4, which is configured to perform image processing by using an image taken by the external camera 3, as well as the current travel speed of the own vehicle 2. Then, the travel speed detecting circuit 11a calculates one of an average travel speed and a maximum travel speed of the preceding vehicles, to be notified to the maximum curvature estimating circuit 12. The maximum curvature estimating circuit 12 is configured to estimate the maximum curvature of a travel path based on the travel speed of the own vehicle. The curvature correcting circuit 13 is configured to correct, based on the maximum curvature obtained from the maximum curvature estimating circuit 12, the curvature of the lane separation line acquired from the image processing device 4, which includes the lane separation line detecting circuit 41 configured to acquire an image from the external camera 3 and to detect the lane separation line by image processing, and to output the corrected lane separation line detection information to the lane departure prevention control device 5. The lane departure prevention control device 5 may also be a lane departure prevention warning device.

<Operation of Lane Separation Line Detection Correcting Device 1>

Figure 4:
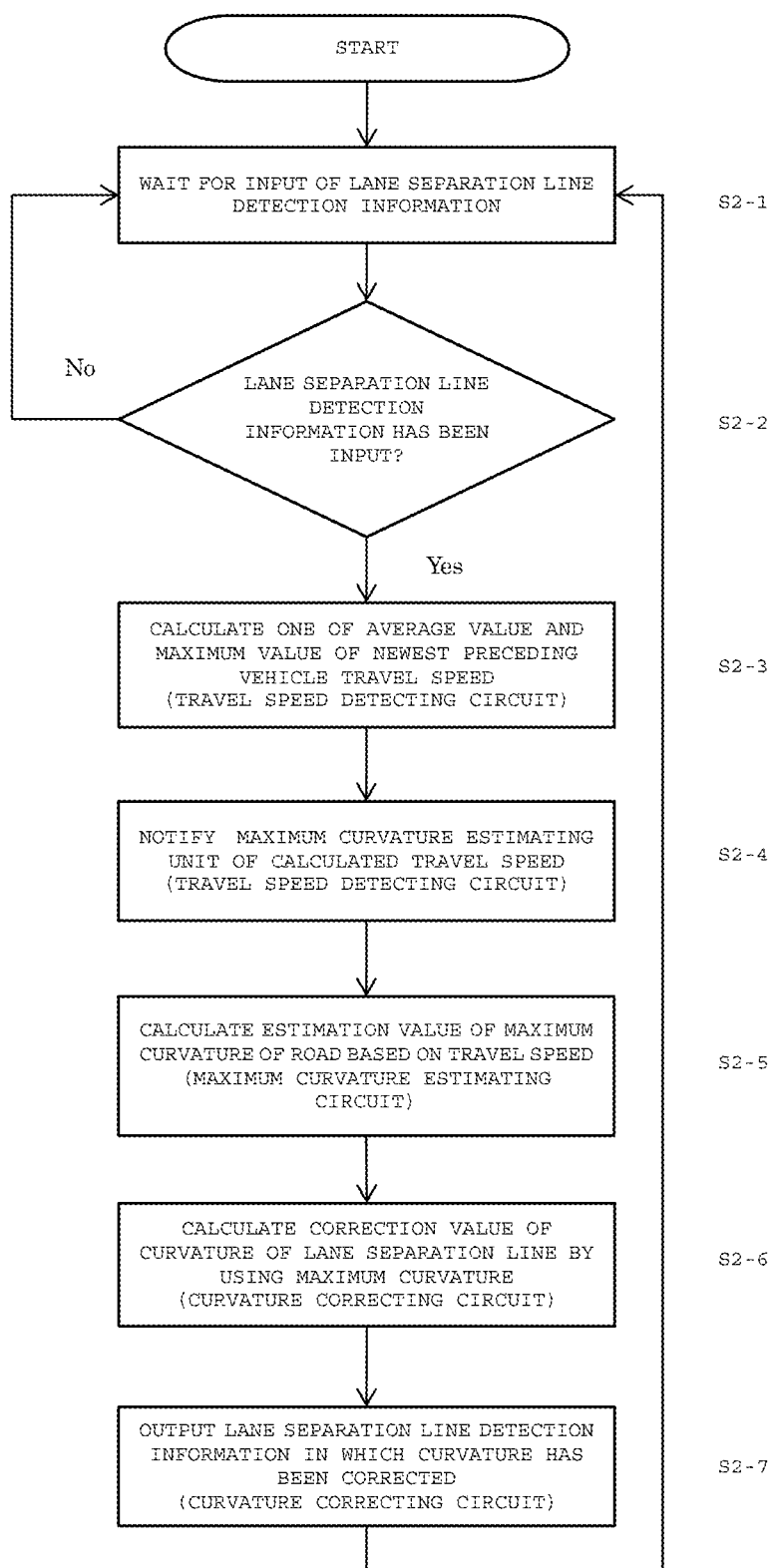
FIG. 4 is a flowchart for illustrating an algorithm according to the second embodiment illustrated in FIG. 3.

An operation flowchart of the lane separation line detection correcting device 1 is illustrated in FIG. 4. First, the lane separation line detection correcting device 1 waits for input of lane separation line detection information from the lane separation line detecting circuit 41 of the image processing device 4 (Steps S2-1 and S2-2). At the time when the lane separation line detection information is input, the travel speed detecting circuit 11a calculates one of an average value and a maximum value of the travel speeds of a plurality of preceding vehicles based on the relative speeds of the plurality of preceding vehicles received from the vehicle detecting circuit 42 of the image processing device 4 and the travel speed of the own vehicle input from the own vehicle 2 (Step S2-3). For a single preceding vehicle, the relative speed of that vehicle assumes the calculation result. For no preceding vehicles, the relative speed is calculated as "0".

Next, the travel speed detecting circuit 11a notifies the maximum curvature estimating circuit 12 of the calculated travel speed (Step S2-4). The maximum curvature estimating circuit 12 calculates the estimation value of the maximum curvature of the road based on the average speed or maximum speed of the preceding vehicles input immediately before that notification, and transmits the calculated estimation value to the curvature correcting circuit 13 (Step S2-5). The curvature correcting circuit 13 then uses the maximum curvature to correct the curvature of the lane separation line input from the lane separation line detecting circuit 41 of the image processing device 4 (Step S2-6), and outputs the corrected lane separation line detection information to the external lane departure prevention control device 5 (Step S2-7).

<Operation of Maximum Curvature Estimating Circuit 12>

The maximum curvature estimating circuit 12 is configured to calculate the estimation value of the maximum curvature of the lane separation line based on the input average speed or maximum speed of the preceding vehicles. The maximum curvature estimating circuit 12 is configured to calculate the estimation value κ of the maximum curvature based on Expression (1) mentioned in the first embodiment, and to transmit the calculated estimation value κ to the curvature correcting circuit 13.

<Operation of Curvature Correcting Circuit 13>

The curvature correcting circuit 13 is configured to calculate the corrected curvature $L_i$ by correcting the curvature $K_i$ in the lane separation line detection information in accordance with Expression (3) based on the estimation value κ of the maximum curvature calculated by the maximum curvature estimating circuit 12, and to output lane separation line detection information containing the calculated curvature $L_i$ to the external lane departure prevention control device 5:

$$\begin{cases} L_i = K_i & (\kappa \geq K_i) \\ L_i = L_{i-1} + (L_{i-1} - L_{i-2}) & (\kappa < K_i) \end{cases} \quad \text{Expression (3)}$$

where $L_{i-1}$ represents the curvature of the lane separation line detection information corrected the previous time.

Third Embodiment

<Configuration of Lane Separation Line Detection Correcting Device 1>

Figure 5:
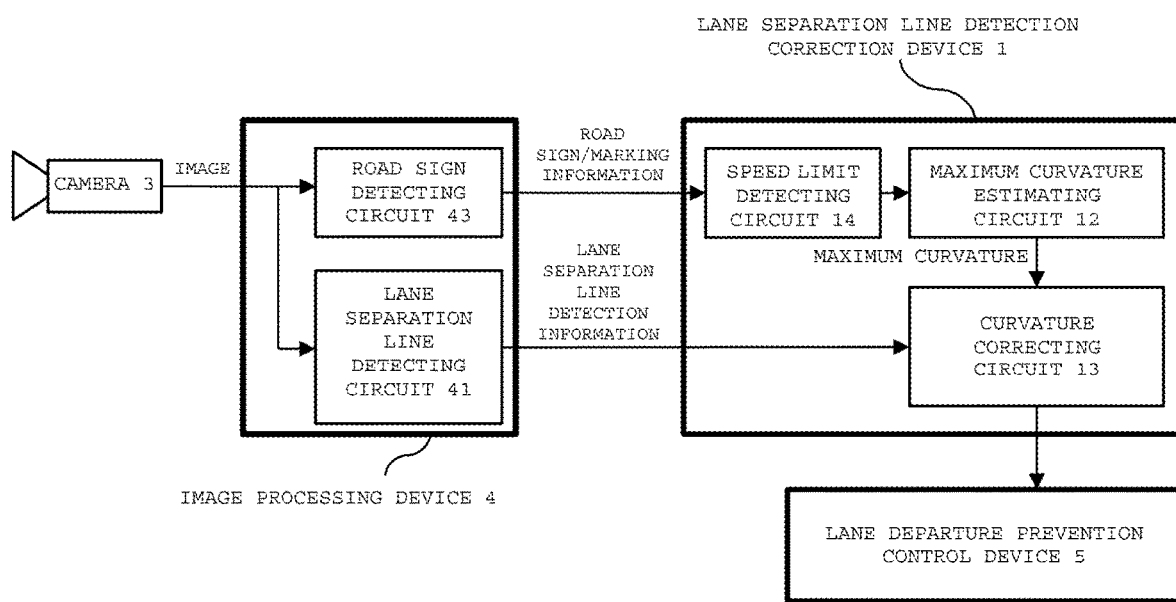
FIG. 5 is a block diagram for illustrating a configuration of a lane separation line detection correcting device and a lane separation line detection correcting method according to a third embodiment of the present invention.

The lane separation line detection correcting device 1 illustrated in FIG. 5 according to a third embodiment of the present invention includes a speed limit detecting circuit 14, the maximum curvature estimating circuit 12, and the curvature correcting circuit 13. The speed limit detecting circuit 14 is configured to detect a speed limit based on road sign/marking information from a road sign detecting circuit 43 of the image processing device 4, which is configured to perform image processing by using an image taken by the camera 3. The maximum curvature estimating circuit 12 is configured to estimate the maximum curvature of the road along which the own vehicle is traveling, based on the detected speed limit. The curvature correcting circuit 13 is configured to correct the curvature of the lane separation line obtained from the lane separation line detecting circuit 41 of the image processing device 4 such that the curvature of the lane separation line may be confined within the maximum curvature calculated by the maximum curvature estimating circuit 12, and to output information on the lane separation line to the lane departure prevention control device 5. The lane departure prevention control device 5 may also be a lane departure prevention warning device.

<Operation of Lane Separation Line Detection Correcting Device 1>

Figure 6:
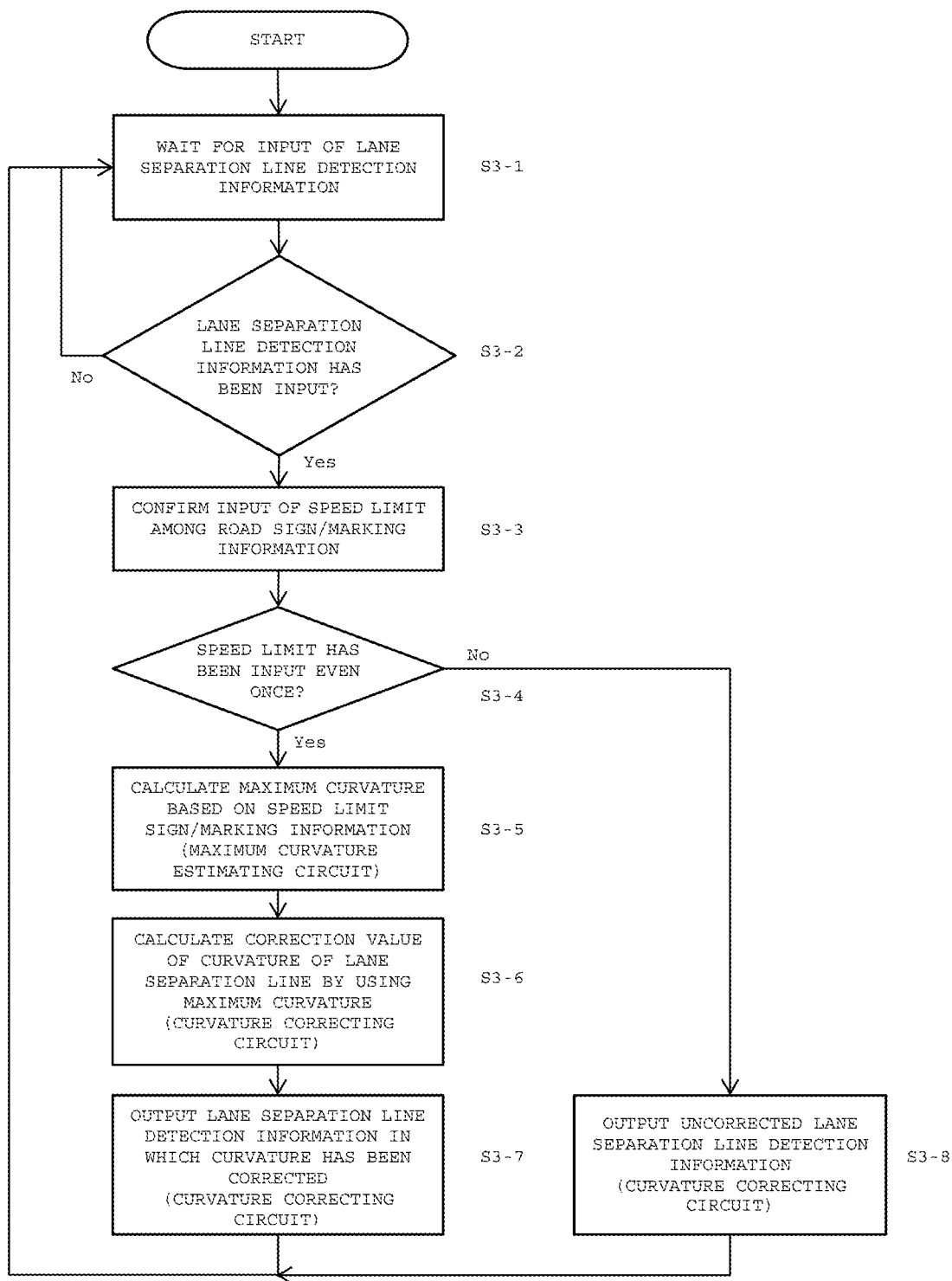
FIG. 6 is a flowchart for illustrating an algorithm according to the third embodiment illustrated in FIG. 5.

An operation flowchart of the lane separation line detection correcting device 1 is illustrated in FIG. 6. First, the lane separation line detection correcting device 1 waits for input of lane separation line detection information from the lane separation line detecting circuit 41 of the image processing device 4 (Steps S3-1 and S3-2). At the time when the lane separation line detection information is input, the speed limit detecting circuit 14 confirms whether or not, from among the road sign/marking information from the road sign detecting circuit 43 of the image processing device 4, information on the speed limit is input even once previously (Steps S3-3 and S3-4). At the time when information on the speed limit is input even once previously, the maximum curvature estimating circuit 12 calculates the maximum curvature of the road along which the own vehicle is traveling or driving based on that speed limit (Step S3-5). Next, the curvature correcting circuit 13 corrects the curvature in the lane separation line detection information such that the curvature may be confined within the maximum curvature (Step S3-6). Finally, the curvature correcting circuit 13 outputs the corrected lane separation line detection information to the lane departure prevention control device 5 (Step S3-7). On the other hand, in Step S3-4, when information on the speed limit has not been input even once previously, the curvature correcting circuit 13 outputs uncorrected lane separation line detection information to the lane departure prevention control device 5 (Step S3-8).

<Operation of Maximum Curvature Estimating Circuit 12>

The maximum curvature estimating circuit 12 is configured to estimate the maximum curvature of the road based on speed limit information input from a road sign. In general, the speed limit is set to be lower than the design speed of the road. Therefore, the maximum curvature estimating circuit 12 is configured to look up and output the curvature from table data of the maximum curvature at the design speed for input speed limit each. For example, the road curvature with respect to the road design speed as indicated in the Road Structure Ordinance defined by the Japanese Ministry of Land, Infrastructure, Transport and Tourism shown in Table 1 may be applied as the table data.

TABLE 1

Maximum Curvature with Respect to Speed Limit

| Speed Limit [km/h] (road design speed) | Maximum Curvature [1/m] |
|---|---|
| 120 | 1/570 |
| 100 | 1/380 |
| 80 | 1/230 |
| 60 | 1/120 |
| 50 | 1/80 |
| 40 | 1/50 |
| 30 | 1/30 |
| 20 | 1/15 |

<Operation of Curvature Correcting Circuit 13>

The curvature correcting circuit 13 is configured to calculate the corrected curvature $L_i$ by correcting the curvature $K_i$ in the lane separation line detection information in accordance with Expression (1) or Expression (2) based on the estimation value κ of the maximum curvature calculated by the maximum curvature estimating circuit 12.

Fourth Embodiment

<Configuration of Lane Separation Line Detection Correcting Device 1>

Figure 7:
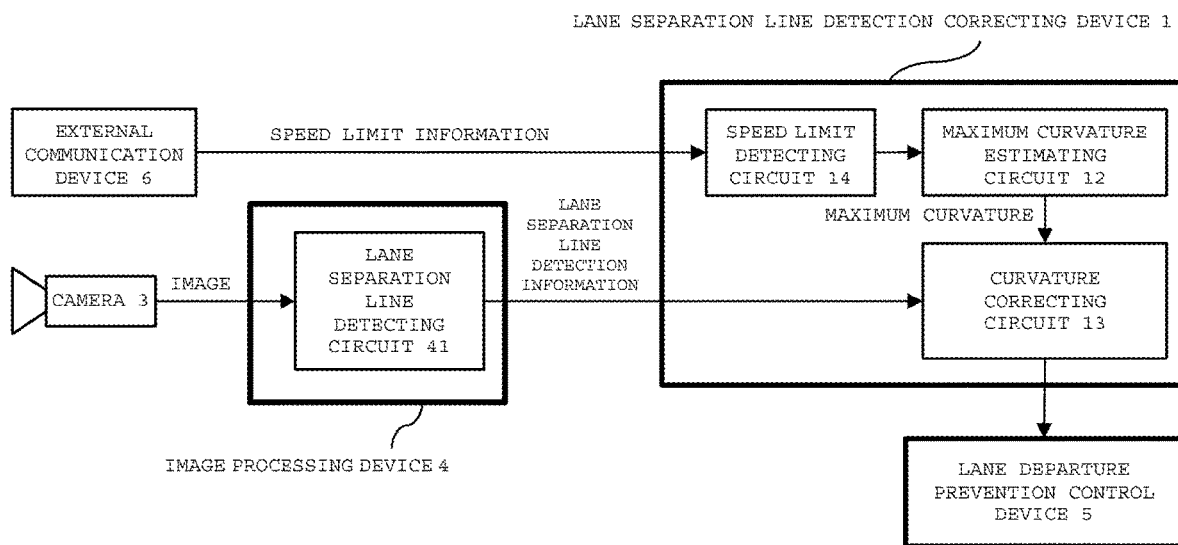
FIG. 7 is a block diagram for illustrating a configuration of a lane separation line detection correcting device and a lane separation line detection correcting method according to a fourth embodiment of the present invention.

The lane separation line detection correcting device 1 illustrated in FIG. 7 according to a fourth embodiment of the present invention includes the speed limit detecting circuit 14, the maximum curvature estimating circuit 12, and the curvature correcting circuit 13. The speed limit detecting circuit 14 is configured to obtain from an external communication device 6, e.g., a road-to-vehicle communication system, information on the speed limit of the road currently being traveled along. The maximum curvature estimating circuit 12 is configured to estimate the maximum curvature of the road along which the own vehicle is traveling based on the obtained speed limit. The curvature correcting circuit 13 is configured to correct the curvature of the lane separation line obtained from the lane separation line detecting circuit 41 of the image processing device 4, which is configured to perform image processing with an image taken by the camera 3, to be confined within the maximum curvature calculated by the maximum curvature estimating circuit 12, and to output information on the lane separation line to the lane departure prevention control device 5. The lane departure prevention control device 5 may also be a lane departure prevention warning device.

<Operation of Lane Separation Line Detection Correcting Device 1>

Figure 8:
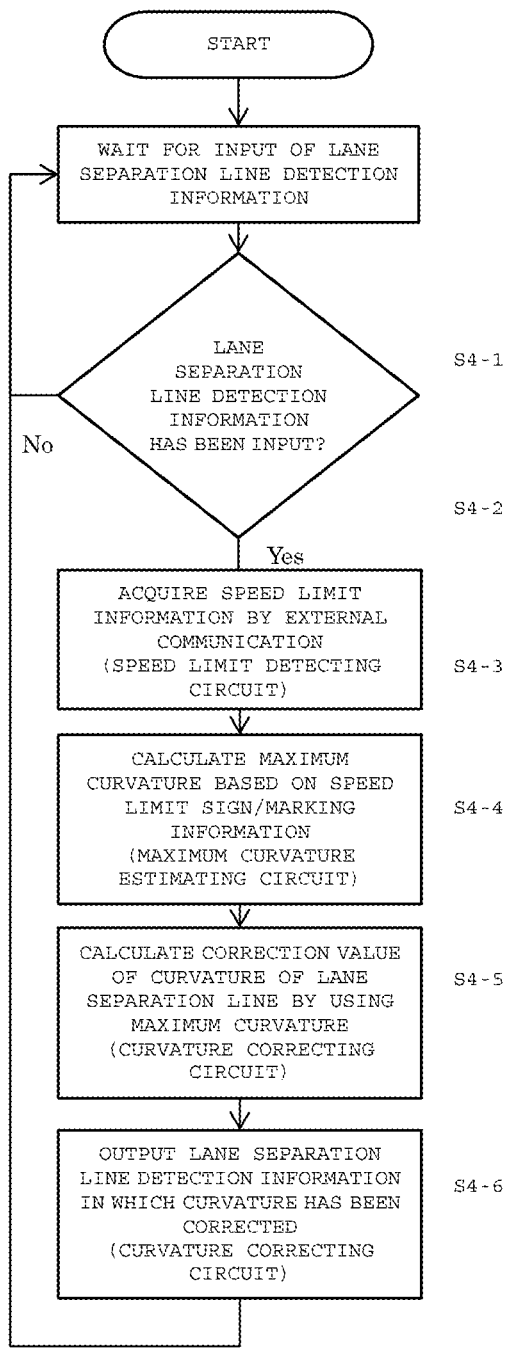
FIG. 8 is a flowchart for illustrating an algorithm according to the fourth embodiment illustrated in FIG. 7.

An operation flowchart of the lane separation line detection correcting device 1 is illustrated in FIG. 8. First, the lane separation line detection correcting device 1 waits for input of lane separation line detection information from the lane separation line detecting circuit 41 of the image processing device 4 (Steps S4-1 and S4-2). At the time when the lane separation line detection information is input, the speed limit detecting circuit 14 acquires the speed limit of the road along which the vehicle is currently traveling from the external communication device 6 (Step S4-3). At the time when the speed limit is acquired, the maximum curvature estimating circuit 12 calculates the maximum curvature of the traveling road based on the speed limit (Step S4-4). Next, the curvature correcting circuit 13 corrects the curvature in the lane separation line detection information such that the curvature may be confined within the maximum curvature (Step S4-5). Finally, the curvature correcting circuit 13 outputs the corrected lane separation line detection information to the lane departure prevention control device 5 (Step S4-6).

It is to be noted that the operation of the maximum curvature estimating circuit 12 and the operation of the curvature correcting circuit 13 are the same as in the third embodiment.

Fifth Embodiment

<Configuration of Lane Separation Line Detection Correcting Device 1>

Figure 9:
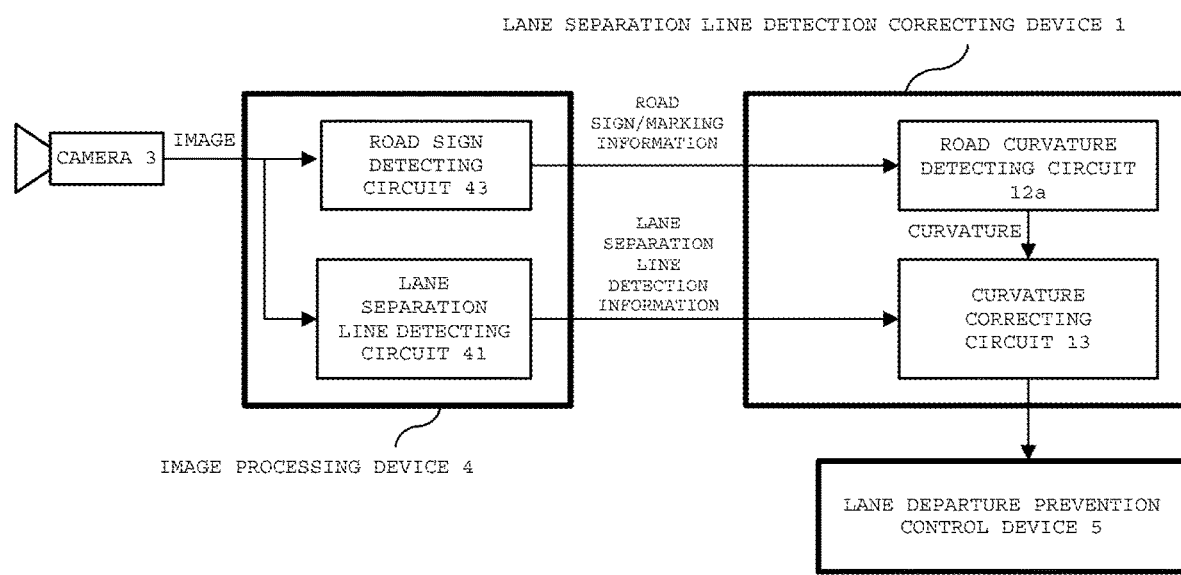
FIG. 9 is a block diagram for illustrating a configuration of a lane separation line detection correcting device and a lane separation line detection correcting method according to a fifth embodiment of the present invention.

The lane separation line detection correcting device 1 illustrated in FIG. 9 according to a fifth embodiment of the present invention includes a road curvature detecting circuit 12a and the curvature correcting circuit 13. The road curvature detecting circuit 12a is configured to extract information on the road curvature from road sign information output from the road sign detecting circuit 43 of the image processing device 4, which is configured to perform image processing by using an image taken by the camera 3. The curvature correcting circuit 13 is configured to correct the curvature of the lane separation line obtained from the lane separation line detecting circuit 41 of the image processing device 4 to be confined within the curvature extracted by the road curvature detecting circuit 12a, and to output information on the lane separation line to the lane departure prevention control device 5. The lane departure prevention control device 5 may also be a lane departure prevention warning device.

<Operation of Lane Separation Line Detection Correcting Device 1>

Figure 10:
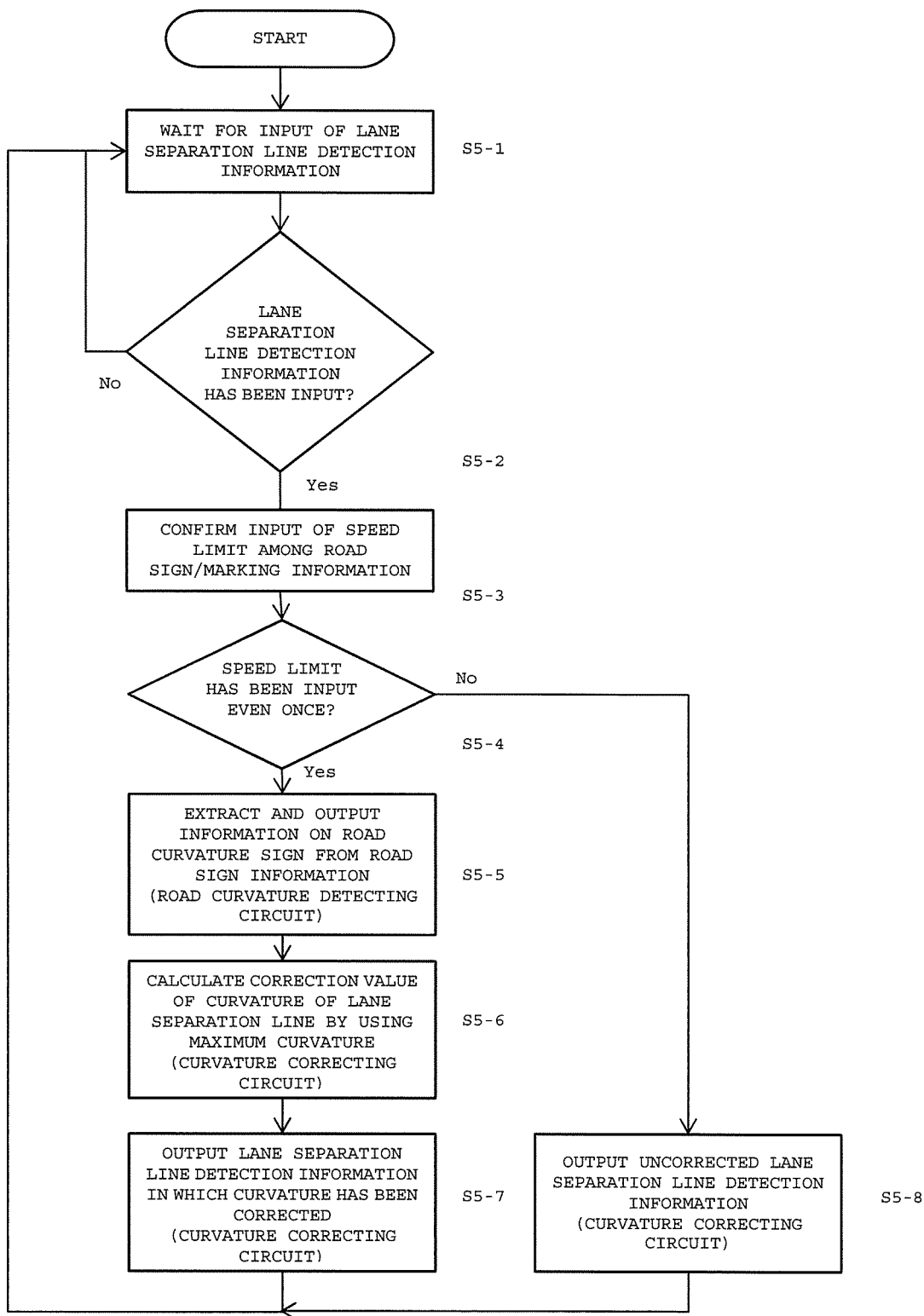
FIG. 10 is a flowchart for illustrating an algorithm according to the fifth embodiment illustrated in FIG. 9.

An operation flowchart of the lane separation line detection correcting device 1 is illustrated in FIG. 10. First, the lane separation line detection correcting device 1 waits for input of lane separation line detection information from the lane separation line detecting circuit 41 of the image processing device 4 (Steps S5-1 and S5-2). At the time when the lane separation line detection information is input, the road curvature detecting circuit 12a confirms whether or not information on a road curvature sign among the road sign/marking information from the road sign detecting circuit 43 of the image processing device 4, is input even once previously (Steps S5-3 and S5-4). At the time when information on a road curvature sign is input even once previously, the road curvature detecting circuit 12a extracts the information on the road curvature sign, and outputs the extracted information to the curvature correcting circuit 13 (Step S5-5). Next, the curvature correcting circuit 13 corrects the curvature in the lane separation line detection information so that the curvature may be confined within the maximum curvature (Step S5-6). Finally, the curvature correcting circuit 13 outputs the corrected lane separation line detection information to the lane departure prevention control device 5 (Step S5-7). On the other hand, in Step S5-4, when information on a road curvature sign has not been input even once previously, the curvature correcting circuit 13 outputs uncorrected lane separation line detection information to the lane departure prevention control device 5 (Step S5-8).

Sixth Embodiment

<Configuration of Lane Separation Line Detection Correcting Device 1>

Figure 11A:
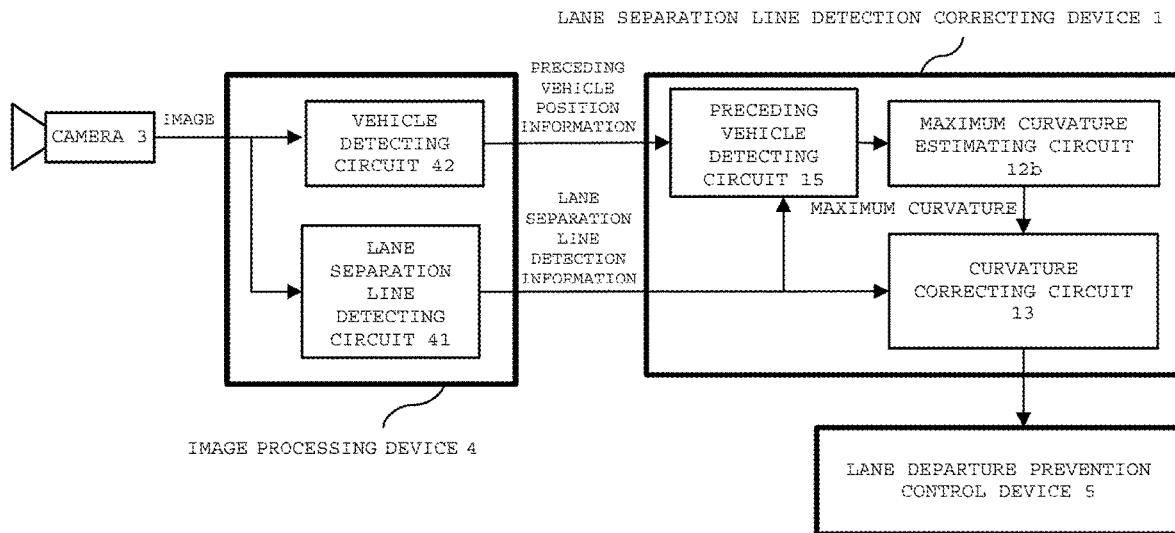
FIG. 11A is a block diagram for illustrating a configuration of a lane separation line detection correcting device and a lane separation line detection correcting method according to a sixth embodiment of the present invention.

The lane separation line detection correcting device 1 illustrated in FIG. 11A according to a sixth embodiment of the present invention includes a preceding vehicle detecting circuit 15, a maximum curvature estimating circuit 12b, and the curvature correcting circuit 13. The preceding vehicle detecting circuit 15 is configured to acquire a position of a preceding vehicle (front-and-rear distance and right-and-left distance) from the vehicle detecting circuit 42 of the image processing device 4, which is configured to perform image processing by using an image taken by the camera 3. The maximum curvature estimating circuit 12b is configured to estimate the maximum curvature of the traveling road based on the position of the preceding vehicle. The curvature correcting circuit 13 is configured to correct the curvature of the lane separation line input from the lane separation line detecting circuit 41 of the image processing device 4 to be confined within the maximum curvature calculated by the maximum curvature estimating circuit 12b, and to output information on the lane separation line to the lane departure prevention control device 5. The lane departure prevention control device 5 may also be a lane departure prevention warning device.

<Operation of Lane Separation Line Detection Correcting Device 1>

Figure 12:
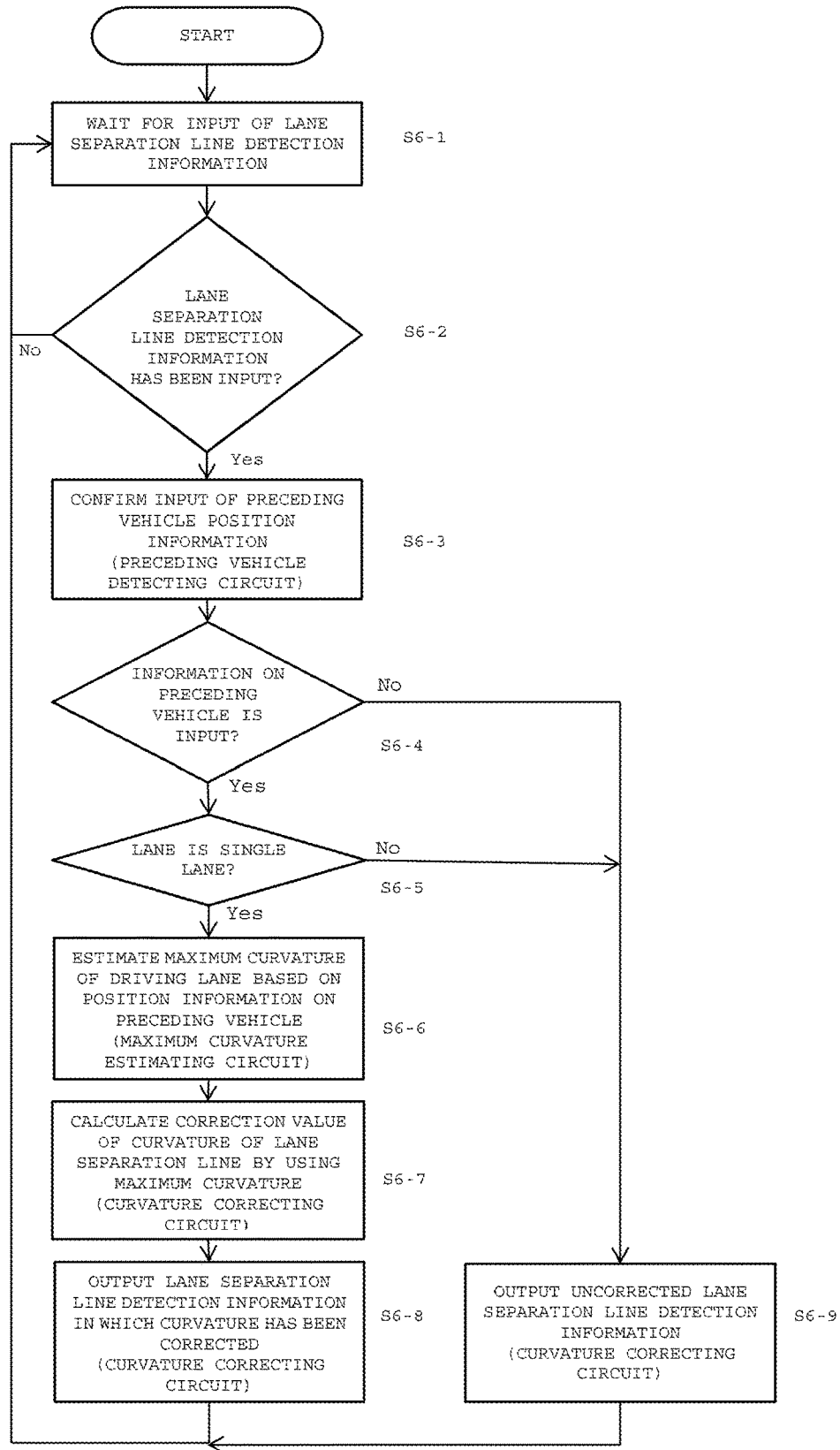
FIG. 12 is a flowchart for illustrating an algorithm according to the sixth embodiment illustrated in FIG. 11.

An operation flowchart of the lane separation line detection correcting device 1 is illustrated in FIG. 12. First, the lane separation line detection correcting device 1 waits for input of lane separation line detection information from the lane separation line detecting circuit 41 of the image processing device 4 (Steps S6-1 and S6-2). At the time when the lane separation line detection information is input, the preceding vehicle detecting circuit 15 confirms whether or not information on a preceding vehicle is currently being periodically input from the vehicle detecting circuit 42 of the image processing device 4 (Steps S6-3 and S6-4). At the time when information on a preceding vehicle is input, the preceding vehicle detecting circuit 15 then confirms based on the input lane separation line detection information input next, whether or not the traveling lane is a single lane (Step S6-5). If it is determined that the position information on the preceding vehicle is not input, or that the traveling lane is not a single lane, this means that there is no preceding vehicles. In such a case, the curvature correcting circuit 13 outputs uncorrected lane separation line detection information (Step S6-9). If it is determined that the traveling lane is a single lane, the maximum curvature estimating circuit 12b estimates the maximum curvature of the driving lane based on the position information on the preceding vehicle (Step S6-6). If it is not the case, the processing is advanced to Step S6-9, and correction of the lane separation line detection information is not performed. Next, in Step S6-7, the curvature correcting circuit 13 corrects the curvature in the lane separation line detection information so that the curvature may be confined within the estimated maximum curvature. Finally, the curvature correcting circuit 13 outputs the corrected lane separation line detection information to the lane departure prevention control device 5 (Step S6-8).

<Operation of Maximum Curvature Estimating Circuit 12b>

Figure 11B:
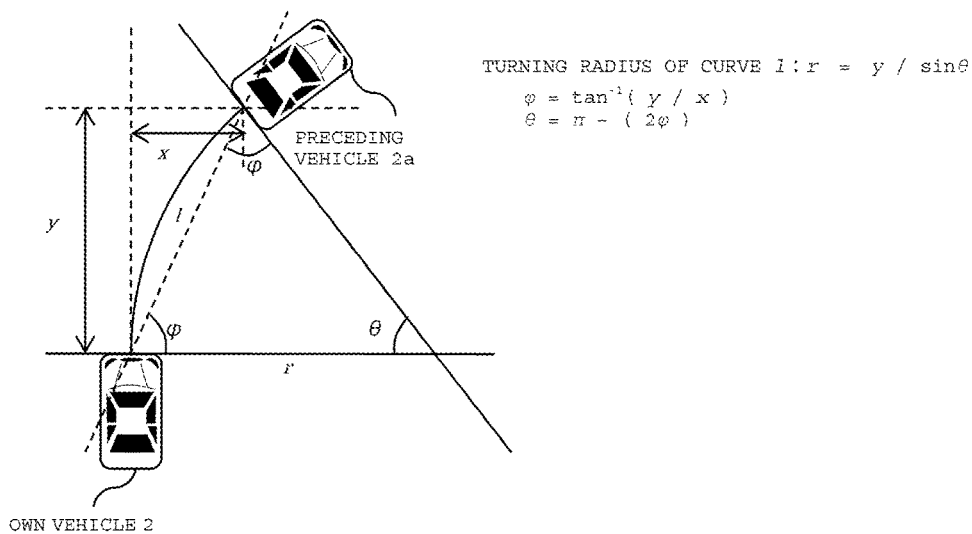
FIG. 11B is a schematic diagram of travel around a curve for illustrating a relation between a preceding vehicle and an own vehicle according to the sixth embodiment of the present invention.

The maximum curvature estimating circuit 12b is configured to estimate the maximum curvature of the driving lane based on preceding vehicle detection position information in which the input position of the own vehicle is made the original point. As illustrated in FIG. 11B, the maximum curvature estimating circuit 12b is configured to calculate a curvature $l^{-1}$ [1/m] by calculating a turning radius [m]=y/sin θ of a curve l based on a relation between the detected position input of a preceding vehicle 2a and the position of the own vehicle 2. The calculated curvature $l^{-1}$ [1/m] is output to the curvature correcting circuit 13 as the estimation value of the maximum curvature.

Seventh Embodiment

<Configuration of Lane Separation Line Detection Correcting Device 1>

Figure 13A:
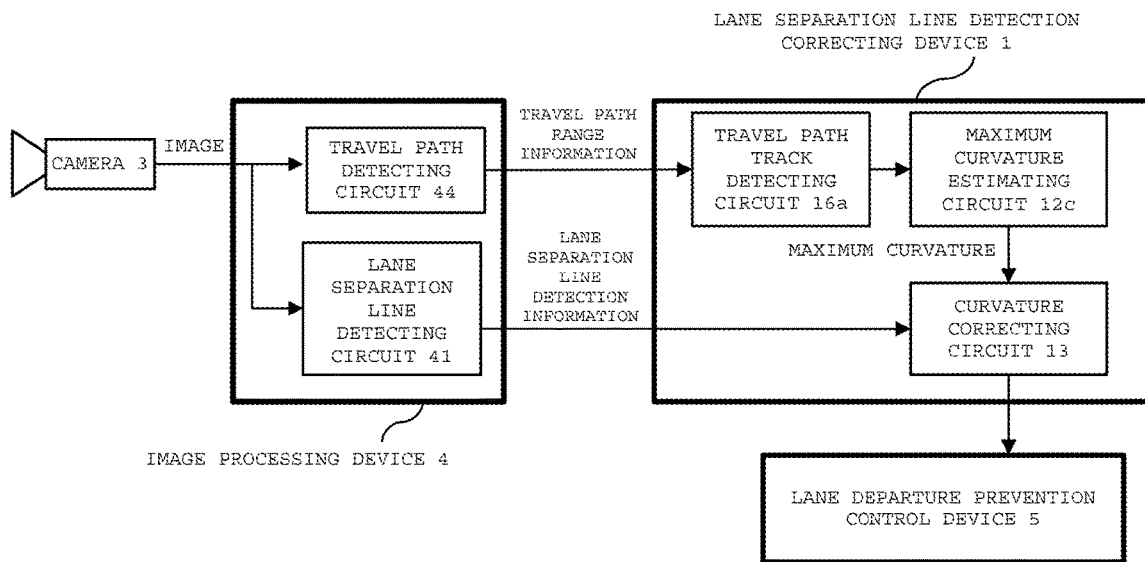
FIG. 13A is a block diagram for illustrating a configuration of a lane separation line detection correcting device and a lane separation line detection correcting method according to a seventh embodiment of the present invention.

The lane separation line detection correcting device 1 illustrated in FIG. 13A according to a seventh embodiment of the present invention includes a travel path track detecting circuit 16, a maximum curvature estimating circuit 12c, and the curvature correcting circuit 13. The travel path track detecting circuit 16 is configured to acquire range information on a travel path output from a travel path detecting circuit 44 of the image processing device 4, which is configured to perform image processing with an image taken by the camera 3. The maximum curvature estimating circuit 12c is configured to estimate the maximum curvature of the traveling lane based on the acquired range information on the travel path. The curvature correcting circuit 13 is configured to correct the curvature of the lane separation line obtained from the lane separation line detecting circuit 41 of the image processing device 4 to be confined within the maximum curvature calculated by the maximum curvature estimating circuit 12c, and to output information on the lane separation line to the lane departure prevention control device 5. The lane departure prevention control device 5 may also be a lane departure prevention warning device.

<Operation of Lane Separation Line Detection Correcting Device 1>

Figure 14:
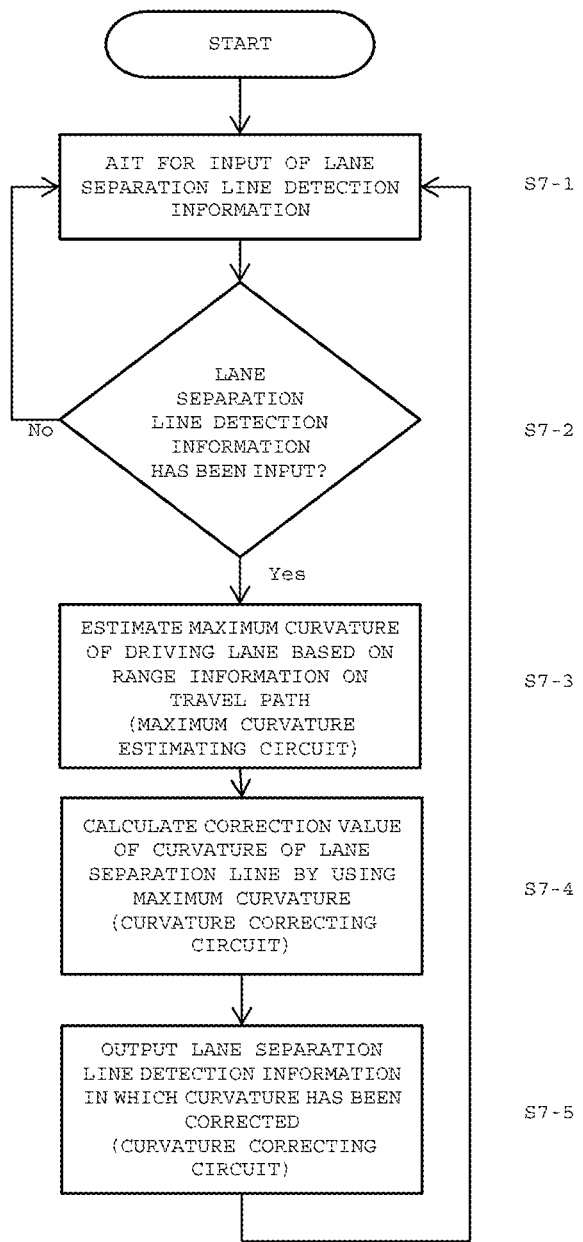
FIG. 14 is a flowchart for illustrating an algorithm according to the seventh embodiment illustrated in FIG. 13.

An operation flowchart of the lane separation line detection correcting device 1 is illustrated in FIG. 14. First, the lane separation line detection correcting device 1 waits for input of lane separation line detection information from the travel path detecting circuit 44 of the image processing device 4 (Steps S7-1 and S7-2). At the time when the lane separation line detection information is input, the maximum curvature estimating circuit 12c inputs the range information on the travel path from the travel path detecting circuit 44 of the image processing device 4 via the travel path track detecting circuit 16, and estimates the maximum curvature of the driving lane (Step S7-3). Next, in Step S7-4, the curvature correcting circuit 13 corrects the curvature in the lane separation line detection information such that the curvature may be confined within the maximum curvature. Finally, the curvature correcting circuit 13 outputs the corrected lane separation line detection information to the lane departure prevention control device 5 (Step S7-5).

<Operation of Maximum Curvature Estimating Circuit 12c>

Figure 13B:
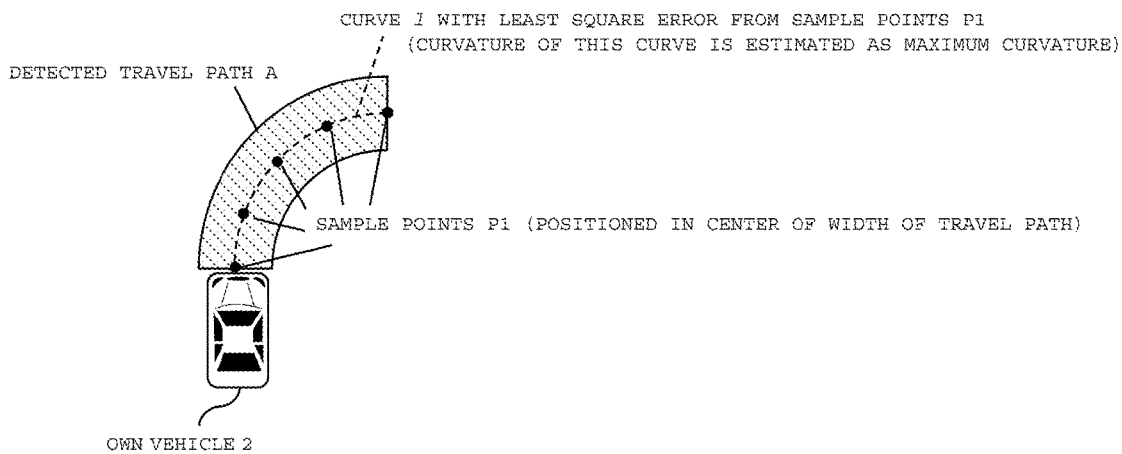
FIG. 13B is a schematic diagram of travel around a curve for illustrating a travel track of the own vehicle according to the seventh embodiment of the present invention.

The maximum curvature estimating circuit 12c is configured to estimate the maximum curvature of the driving lane based on the input range information on the travel path. As illustrated in FIG. 13B, the maximum curvature estimating circuit 12c is configured to extract, from a travel path range A detected, a plurality of coordinate points P1 that lie in the center of the width of the road, and to calculate a curvature $l^{-1}$ [1/m] of a curve with the least square error distance from those coordinate points P1 by using least square method. This calculated curvature $l^{-1}$ [1/m] is output to the curvature correcting circuit 13 as the maximum curvature.

Eighth Embodiment

Figure 15A:
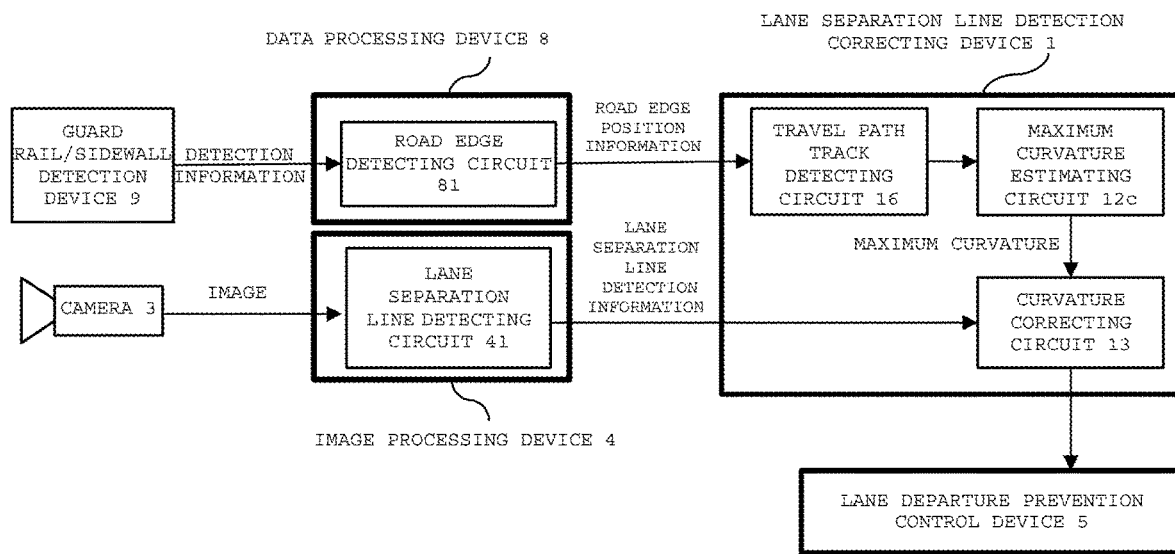
FIG. 15A is a block diagram for illustrating a configuration of a lane separation line detection correcting device and a lane separation line detection correcting method according to an eighth embodiment of the present invention.

The lane separation line detection correcting device 1 illustrated in FIG. 15A according to an eighth embodiment of the present invention includes the travel path track detecting circuit 16, the maximum curvature estimating circuit 12c, and the curvature correcting circuit 13. The travel path track detecting circuit 16 is configured to acquire position information on road edges output from a road edge detecting circuit 81 of a data processing device 8, which is configured to process detection data, such as millimeter wave radar data and laser radar data. The maximum curvature estimating circuit 12c is configured to estimate the maximum curvature of the traveling lane. The curvature correcting circuit 13 is configured to correct the curvature of the lane separation line obtained from the lane separation line detecting circuit 41 of the image processing device 4 to be confined within the maximum curvature calculated by the maximum curvature estimating circuit 12c, and to output information on the lane separation line to the lane departure prevention control device 5. The lane departure prevention control device 5 may also be a lane departure prevention warning device.

<Operation of Lane Separation Line Detection Correcting Device 1>

Figure 16:
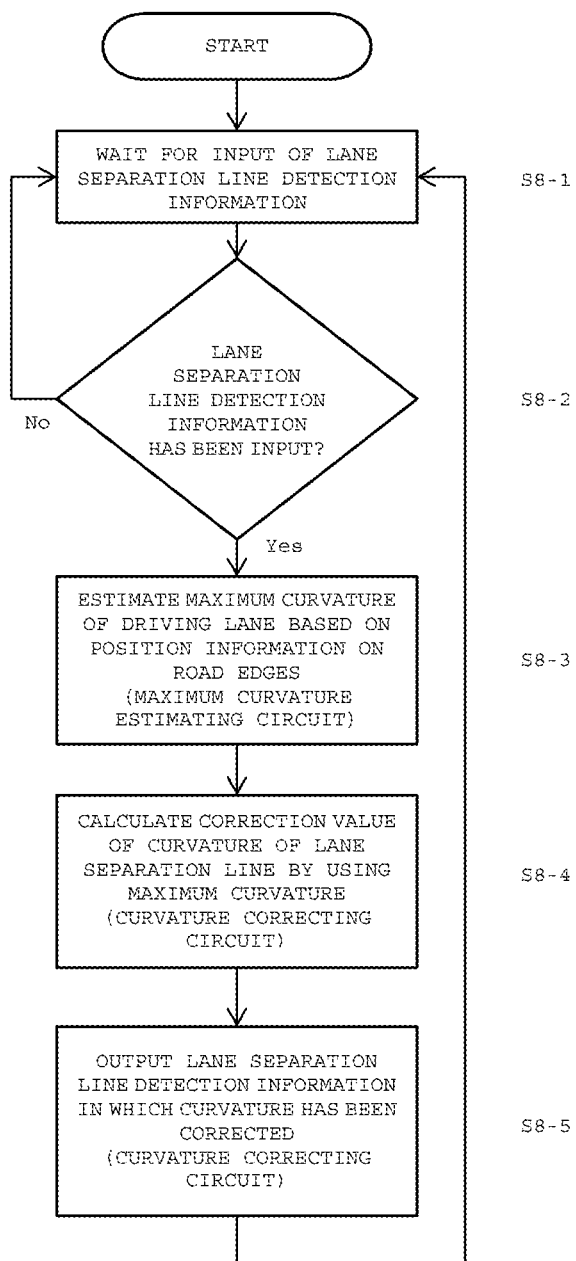
FIG. 16 is a flowchart for illustrating an algorithm according to the eighth embodiment illustrated in FIG. 15.

An operation flowchart of the lane separation line detection correcting device 1 is illustrated in FIG. 16. First, the lane separation line detection correcting device 1 waits for input of lane separation line detection information from the lane separation line detecting circuit 41 of the image processing device 4 (Steps S8-1 and S8-2). At the time when the lane separation line detection information is input, the maximum curvature estimating circuit 12c inputs via the travel path track detecting circuit 16 the position information on the road edges input from the road edge detecting circuit 81 of the image processing device 4, and estimates the maximum curvature of the driving lane (Step S8-3). Next, in Step S8-4, the curvature correcting circuit 13 corrects the curvature in the lane separation line detection information so that the curvature may be confined within the maximum curvature, and outputs the corrected lane separation line detection information to the lane departure prevention control device 5 (Step S8-5).

<Operation of Maximum Curvature Estimating Circuit 12c>

Figure 15B:
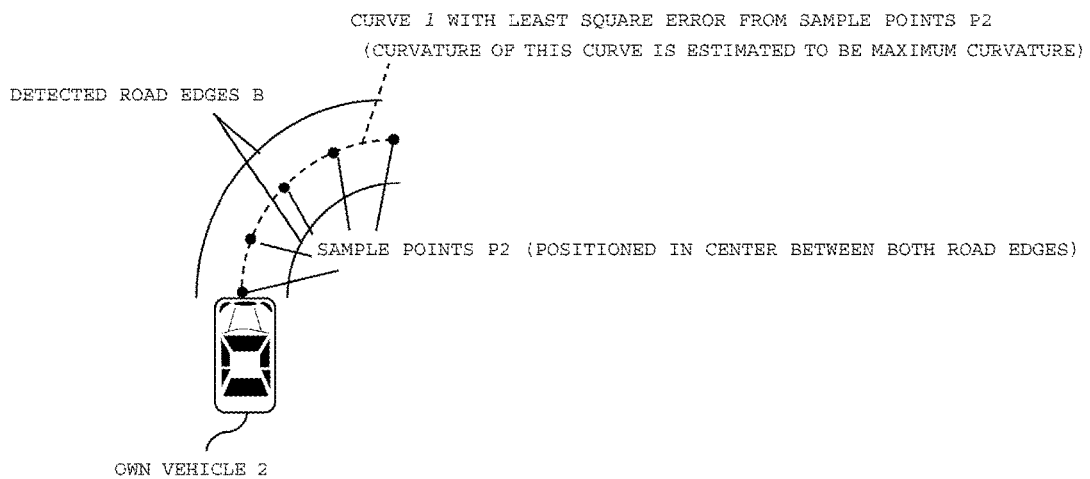
FIG. 15B is a schematic diagram of travel around a curve for illustrating the travel track of the own vehicle between road edges according to the eighth embodiment of the present invention.

The maximum curvature estimating circuit 12c is configured to estimate the maximum curvature of the driving lane based on the input position information on the road edges. As illustrated in FIG. 15B, the maximum curvature estimating circuit 12c is configured to extract from the position of road edges B a plurality of coordinate points P2 that lie in the center between both road edges, and to calculate a curvature $l^{-1}$ [1/m] of a curve with the least square error distance from those coordinate points P2 by using least square method. The calculated curvature $l^{-1}$ [1/m] is output to the curvature correcting circuit 13 as the maximum curvature.

Ninth Embodiment

<Configuration of Automatic Driving System>

In an automatic driving system according to a ninth embodiment of the present invention, the lane separation line detection correcting device 1 described in the first to eighth embodiments is mounted as it is. The automatic driving system includes a control unit configured to control the travel of the own vehicle 2 based on the curvature of the lane separation line corrected by the curvature correcting circuit 13 of the lane separation line detection correcting device 1.

<Operation of Lane Separation Line Detection Correcting Device 1>

Operation of the lane separation line detection correcting device 1 is the same as that of the lane separation line detection correcting devices 1 described in the first to eighth embodiments.

The control unit is configured to control the travel of the own vehicle 2 based on the curvature of the lane separation line corrected by the curvature correcting circuit 13 of the lane separation line detection correcting device 1.

Modified Examples of Various Embodiments

The curvature correcting circuit 13 of the first to ninth embodiments may be configured to preliminarily store a plurality of maximum curvatures from the maximum curvature estimating circuits 12, 12b, and 12c or from the road curvature detecting circuit 12a, and to perform, when the curvature in the input lane separation line detection information exceeds the maximum curvature determined last, correction by using the latest maximum curvature that does not exceed the above maximum curvature among the stored maximum curvatures.

The curvature correcting circuit 13 may also be configured to store a plurality of maximum curvatures from the maximum curvature estimating circuits 12, 12b, and 12c or from the road curvature detecting circuit 12a, and to perform, when the curvature in the input lane separation line detection information exceeds the maximum curvature determined last, correction by calculating, in accordance with Expression (3), the maximum curvature at the current point among the plurality of maximum curvatures stored based on a change amount in the maximum curvature obtained from a difference among the maximum curvatures stored.

What is claimed is:

1. An automatic driving system, comprising:
a speed sensor to detect a travel speed of a host vehicle,
a camera to capture an image of a lane separation line of a road along which the host vehicle is traveling;
at least one processor configured to:
- perform image processing on the captured image to detect the lane separation line;
- estimate a first maximum curvature of the road along which the host vehicle is traveling, based on the travel speed of the host vehicle, estimate a second maximum curvature of the road based on an image of a preceding vehicle of the host vehicle, estimate a third maximum curvature of the road based on a speed limit of the road, and estimate a fourth maximum curvature of a travel path of the host vehicle;
- store in a memory, a plurality of maximum curvatures that comprise the first maximum curvature, the second maximum curvature, the third maximum curvature, and the fourth maximum curvature; and
- correct a curvature of the lane separation line that is estimated through the image processing, based on the latest stored maximum curvature among the plurality of maximum curvatures when the latest stored maximum curvature is less that a presently used maximum curvature; and a control circuit to control steering of the host vehicle based on the corrected curvature of the lane separation line.

* * * * *